United States Patent
Herzog et al.

(10) Patent No.: US 8,580,867 B2
(45) Date of Patent: Nov. 12, 2013

(54) VULCANIZABLE RUBBER MIXTURE AND RUBBER PRODUCTS COMPRISING THE SAME

(75) Inventors: Katharina Herzog, Harsum (DE); Carla Recker, Hannover (DE); Jürgen Wagemann, Bad Salzdetfurth (DE); Marc Laschet, Hannover (DE); Christoph Rose, Hannover (DE); Boris Mergell, Barsinghausen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 329 days.

(21) Appl. No.: 12/801,527

(22) Filed: Jun. 14, 2010

(65) Prior Publication Data

US 2010/0292366 A1 Nov. 18, 2010

Related U.S. Application Data

(63) Continuation of application No. PCT/EP2008/066131, filed on Nov. 25, 2008.

(30) Foreign Application Priority Data

Dec. 14, 2007 (EP) .................... 07024325

(51) Int. Cl.
  *C08J 5/14* (2006.01)
(52) U.S. Cl.
  USPC ........... 523/150; 524/575; 524/413; 524/432; 524/433; 524/430; 524/434; 524/436; 524/437; 524/442; 524/547
(58) Field of Classification Search
  USPC ....................................... 523/150
  See application file for complete search history.

(56) References Cited

U.S. PATENT DOCUMENTS

| | | | |
|---|---|---|---|
| 5,171,800 A | 12/1992 | Bronstert | |
| 5,206,301 A | 4/1993 | Hattori et al. | |
| 5,502,131 A * | 3/1996 | Antkowiak et al. | 526/180 |
| 5,550,200 A * | 8/1996 | Shibata et al. | 526/174 |
| 5,916,961 A | 6/1999 | Hergenrother et al. | |
| 5,929,149 A * | 7/1999 | Matsuo et al. | 524/262 |
| 6,133,388 A | 10/2000 | Lee et al. | |
| 6,344,518 B1 | 2/2002 | Kobayashi et al. | |
| 6,667,362 B2 | 12/2003 | Robert et al. | |
| 6,765,065 B2 | 7/2004 | Oshima et al. | |
| 7,250,476 B1 | 7/2007 | Böhm et al. | |
| 8,314,185 B2 | 11/2012 | Herzog et al. | |
| 2002/0120082 A1 * | 8/2002 | Hsu et al. | 526/180 |
| 2004/0092645 A1 | 5/2004 | Karato et al. | |
| 2008/0177017 A1 | 7/2008 | Suzuki et al. | |

FOREIGN PATENT DOCUMENTS

| | | |
|---|---|---|
| JP | 2000-204129 A | 7/2000 |
| JP | 2001-158834 A | 6/2001 |
| JP | 2004-331940 A | 11/2004 |
| JP | 2005-263905 A | 9/2005 |
| WO | WO 2005/040267 A1 | 5/2005 |

OTHER PUBLICATIONS

Markham, Richard L., "Introduction to Compatibilization of Polymer Blends", Advances in Polymer Technology, (1990), pp. 231 to 236, vol. 10, No. 3, John Wiley & Sons, Inc.
Morita, K. et al, "Polymer Preprints", American Chemical Society, Aug. 1996, pp. 700 to 701, vol. 37, No. 2, The Division of Polymer Chemistry, Inc.
English translation of the summary of the Office action of the Japanese Patent Office dated Jun. 4, 2013 in corresponding Japanese patent application 2010-537364.

* cited by examiner

*Primary Examiner* — Doris Lee
(74) *Attorney, Agent, or Firm* — Walter Ottesen P.A.

(57) ABSTRACT

The vulcanizable rubber mixture according to this invention is used for rubber products in particular vehicle tires and vehicle tire treads, but also technical rubber products like belts on conveyor systems, technical hoses, vibration dampers and impact dampers, or wire coatings. All these products benefit from the improved processability that is achieved with the invention in that the mixture comprises a polymer represented by the formula F1-A-F2, or a mixture of F1-A-F2 with an astral or radial coupling product of F1-A-units, coupled by a multivalent coupling agent; wherein F1 represents a terminal functionalization of the polymeric chain, F2 represents a terminal functionalization different from F1; and A represents the polymeric chain of a polymer formed by the copolymerization between one or more conjugated dienes with one or more aromatic vinyl monomers.

16 Claims, No Drawings

US 8,580,867 B2

VULCANIZABLE RUBBER MIXTURE AND RUBBER PRODUCTS COMPRISING THE SAME

CROSS REFERENCE TO RELATED APPLICATIONS

This application is a continuation application of international patent application PCT/EP 2008/066131, filed Nov. 25, 2008, designating the United States and claiming priority from European application 07024325.8, filed Dec. 14, 2007, and the entire content of both applications is incorporated herein by reference.

FIELD OF THE INVENTION

The invention relates to a vulcanizable rubber mixture and rubber products comprising the same, in particular, vehicle tires and vehicle tire treads, but also technical rubber products like belts on conveyor systems, which can have exposure to weathering, technical hoses, or vibration dampers and impact dampers.

The rubber products mentioned must in practice meet various requirements. For tuning the properties of the technical rubbers, it is common practice to use various modified natural and synthetic rubber polymers with the intention to optimize specific physical, mechanical properties of the vulcanized products. For example, rubber products and, in particular, vehicle tires are required to have good elasticity, low abrasion, and good adhesion on various substrates, and are required to maintain these properties at high and low temperatures.

BACKGROUND OF THE INVENTION

The performance properties of vulcanizates or rubbers used for vehicle tires are specifically adjusted inter alia via the selection of the rubber polymers used, via functionalization of the same, via chemical and/or adsorptive/physical binding to the filler and via the selection of the fillers and additives.

Tire rubber compounds, in particular for treads, often comprise olefinic polymers optionally having aryl side chains. Rubber materials very often used in tire tread mixtures are copolymer rubbers composed of conjugated dienes and of aromatic vinyl compounds. SBR rubber (styrene-butadiene rubber) is the most prominent member of this group.

Alongside the random SBR copolymers, block copolymers are also known, and block formation appears to have a decisive effect on some performance properties.

U.S. Pat. No. 6,667,362 discloses a diene polymer modified terminally by a silanol group and optionally having a polysiloxane spacer. The diene polymer can be an SBR rubber. These elastomers improve the interaction with the filler, but are difficult to process.

SUMMARY OF THE INVENTION

Therefore, it was an object of this invention to improve the processability of pre-elastomers of the SBR-type which is at least partially functionalized at the chain ends without impairing the performance and desired mechanical properties of the vulcanized product.

A polymer of the SBR-type as defined here is a copolymer of an aromatic vinyl monomer and a conjugated diene and, preferably, of styrene and a conjugated diene. SBR-type polymers may have a random or statistical distribution of monomers, an example of this being common SSBR (solution-polymerized copolymer of styrene and 1,3-butadiene). There are also block copolymers of the SBR-type and, in particular, SBR-polymers with controlled microstructure.

The object of the invention is solved by a vulcanizable rubber mixture, which comprises at least one polymer functionalized at least at one chain end (terminally) for binding to fillers, at least one filler and, if appropriate, additives, which is characterized in that the amount of terminally functionalized polymers in the rubber mixture amounts to from 10 to 100 phr and comprises a polymer or a mixture of polymers according to the following particulars:

a) the functionalized polymer can be represented by the formula F1-A-F2;

b) alternatively, the mixture of functionalized polymers is a mixture of a) with a linear, branched or radial coupling product of F1-A-units, coupled by a multivalent coupling agent;

wherein: F1 represents a terminal functionalization of the polymeric chain, and represents preferably one of the following chemical groups: —OH, —COOH, —COX, where X is a halogen, —SH, —CSSH, —NCO, amine, epoxy, S- and N-heterocyclic residues, preferably heterocycloalkanyls and heterocycloalkenyls, in particular pyrolidinyl; F2 represents a terminal functionalization different from F1; and A represents the polymeric chain of a polymer formed by the copolymerization between one or more conjugated dienes with one or more aromatic vinyl monomers in any desired cis- or trans-conformation.

The term phr (parts per hundred parts of rubber by weight) used here is the usual term for amounts for mixing formulations in the rubber industry. The amount added in parts by weight of the individual substances is always based here on 100 parts by weight of entire weight of all of the rubbers present in the mixture.

The polymers which are incorporated into the vulcanizable rubber mixture according to this invention can also be represented by the following formulas, where a tetravalent coupling agent C is chosen:

a)            F1—A—F2;

b)

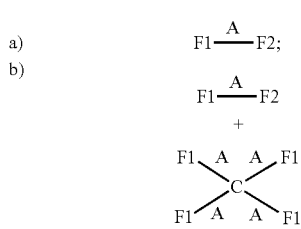

Preferably, C is Si or Sn. In principle, any coupling agent commonly used in polymer chemistry for the coupling of elastomers can be used.

The process for preparation of the specific polymers in the rubber mixture according to the invention comprises the following steps:

formation of a functionalized initiator for functionalization with F1 and then copolymerization of the conjugated diene and aromatic vinyl monomers;

for alternative a): adding a functionalization agent for F2, i.e. adding an agent that will functionalize the copolymer with the still active anionic chains, for alternative b): partial coupling of the active polymeric chains by adding a coupling agent, followed by the F2 functionalization of the remaining active chains.

The copolymerization of copolymers of the SBR-type is usually achieved by the process of anionic polymerization in solution.

As an initiator n-butyl-lithium can be employed. To generate a functionalized initiator, as a general procedure, a functionalizing agent for F1 is first reacted with an initiator. In a preferred embodiment, pyrrolidine is used. Due to its high reactivity, pyrrolidine reacts rapidly with n-butyl-lithium, even in the presence of the monomers, generating "in situ" a functionalized initiator of the type pyrrolidine-lithium, which initiates the copolymerization (K. Morita et al, Polymer Preprints, 37 (2), page 700, 1996).

The coupling agent with functionality larger or equal to 2 is preferably represented by the structures:

$SiR_nX_m$, with $0 \leq n \leq 2$, $2 \leq m \leq 4$, and n+m=4, with X=Hal or —OR, and R=H, alkyl, linear or branched, cycloalkyl, aryl, alkylaryl, aralkyl or vinyl, in each case having 1 to 20 carbon atoms;

$SnR_nX_m$, with $0 \leq n \leq 2$, $2 \leq m \leq 4$, and n+m=4, with X=Hal or —OR, and R=H, alkyl, linear or branched, cycloalkyl, aryl, alkylaryl, aralkyl or vinyl, in each case having 1 to 20 carbon atoms; and $R(R')_m$, where R is as above, except H, R' is a vinyl group and m is the number of units, varying from 2 to 4, as a vinylic coupling reagent divinylbenzene (DVB) can be used.

It is most preferred, however, that the coupling agent is silicon tetrachloride ($SiCl_4$) or stannic tetrachloride ($SnCl_4$). Preferably, the polymer chain unit A comprised in the vulcanizable rubber mixture according to the invention is a randomly or statistically polymerized polymer, i.e. "A" has a random or statistic distribution of comonomer units.

The diolefin can generally be a diene monomer having from 4 to about 10 carbon atoms, particular examples being 1,3-butadiene, 2-alkyl-1,3-butadiene, 2,3-dialkyl-1,3-butadiene, 2-alkyl-3-alkyl-1,3-butadiene, 1,3-pentadiene, 1,3-hexadiene, 2,4-hexadiene, etc.

The polyisoprene can be either 1,4-polyisoprene or 3,4-polyisoprene. The polybutadiene can be either 1,4-polybutadiene or vinyl-polybutadiene.

Most preferably the conjugated diene of chain A is butadiene, preferably 1,3-butadiene. Isoprene or a mixture of butadienes and/or isoprenes can also be used within the scope of the invention.

In the preferred embodiments of the invention, the aromatic vinyl compound is styrene. Of less commercial importance are ortho-, meta- and/or para-methylstyrene, vinyltoluene, p-tert-butylstyrene, methoxystyrene, vinylmesitylene and/or divinylbenzene, which nevertheless can be used or added as well.

The main chain polymer can be a microsequentially polymerized copolymer composed of conjugated diene and of an aromatic vinyl compound and comprising microblocks of a comonomer of length from 2 to 10 units, preferably from 3 to 10 units, more preferably from 3 to 6 units.

The content of 1,2-vinylic units in the polymeric chain A is preferably from 8% to 80%, more preferably from 11% to 80%, and even more preferably from 10% to 70%, based on the total of the conjugated diene incorporated in the copolymer, and can also present different contents of 1,4-cis, and 1,4-trans units, as well as 3,4-vinyl, depending on the conjugated diene employed.

The composition of the polymeric chain A in weight percent is preferably in the range from 5% to 50% for the aromatic vinyl monomer, and in the range from 50% to 95% for the conjugated diene, and preferably from 15% to 40% for the aromatic vinyl monomer, and in the range from 60% to 85% for the conjugated diene.

For the polymer of chain A at least one of the following conditions should be met: the Mooney Viscosity (ML1+4 @ 100° C.) is preferably in a range from 30 to 90, an average molecular weight is in the range from Mw=80,000 to 700,000, with a polydispersion in the range from 1.05 to 4.0, based on polystyrene standards, and the glass transition temperatures Tg are in the range from −92° C. to −1° C.

Advantageously, the mixture comprises from 30 to 90 phr of the elastomers according to a) or b), and the 10 to 70 phr of residual rubber content are preferably composed of at least one elastomer rubber from the group of natural rubber (NR), synthetic polyisoprene (IR), polybutadiene (BR) or polychloroprene (CR), styrene butadiene (SBR), isoprene butadiene (IBR) or styrene isoprene butadiene (SIBR).

The ratio of the linear polymer according to a), i.e. F1-A-F2, to the astral or radiating coupling product $(F1-A-)_nC$, where n corresponds to the binding number of C, is most advantageously in the range of 90:10 to 10:90, preferably from 80:20 to 50:50, and more preferably from 80:20 to 60:40.

The functional group and preferably chain terminating group F2 is preferably a group chosen from the following list, the degree of functionalization, based on the weight of the elastomer(s), being from 30% to 100%, preferably from 50% to 95% and particularly preferably from 75% to 95%:

silyl, silanol or siloxane groups inclusive of, in each case attached to the polymer chain with or without a spacer, polysiloxane groups and siloxane and polysiloxane groups comprising amino groups, and preferably represented by the structures: —$SiH_2(OH)$, —$Si(R_1)_2(OH)$, —$SiH(OH)_2$, —$SiR_1(OH)_2$, —$Si(OH)_3$, —$Si(OR_1)_3$, —$(SiR_1R_2O)_x$—$R_3$, —$Si(R_3)_{3-m}(X)_m$, where X is halogen, x is the number of repetitive units and is from 1 to 500, m is the number of linked groups, from 0 to 3, $R_1$ and $R_2$ are identical or different, and preferably alkoxy or alkyl, linear or branched, cycloalkyl, aryl, alkylaryl, aralkyl or vinyl groups, in each case having 1 to 20 carbon atoms, and $R_3$ is H or alkyl, linear or branched with 1 to 20 carbon atoms, or a mononuclear aryl group, as well as siloxane groups that comprise amine groups, represented by the formula -A1-Si-$(A2-N((H)_k(R_1)_{(2-k)}))_y(OR_1)_z(R_3)_{3-(y+z)}$, where: k can vary from 0 to 2, y can vary from 1 to 3, and z can vary from 0 to 2, $0 \leq y+z \leq 3$, provided that $R_1$ and $R_2$ are identical or different, and can be alkyl, linear or branched, cycloalkyl, aryl, alkylaryl, aralkyl or vinyl groups, in each case having 1 to 20 carbon atoms, and mononuclear aryl groups, $R_3$ is H or alkyl, linear or branched, in each case having 1 to 20 carbon atoms, or a mononuclear aryl group, and A1 and A2 are chains of up to 12 carbon atoms, linear or branched, preferably alkyl, allyl or vinyl.

The functionalization F2 can be introduced by way of a functionalized terminator. As an alternative, the active polymer chain end can, on termination of the polymerization, be reacted with a compound which comprises the desired functional group to be added to the end and also comprises a suitable leaving group. By way of example, this can be achieved via reaction of the reactive polymer ends with compounds such as ethylene oxide, benzophenone, carbon dioxide, dialkylaminobenzaldehyde, carbon disulfide, alkoxysilanes, alkylphenoxysilanes, phenoxysilanes, etc., as is previously known from the prior art to the person skilled in the art. By way of example, U.S. Pat. No. 5,206,301 or U.S. Pat. No. 5,929,149 cite suitable processes and groups.

In a preferred embodiment, F2 is a polysiloxane group of the general formula —$[—Si(alkyl)_2-O—]_x$—, where x is in the range from 1 to 500 units per chain, followed by a silanol termination —$[—Si(alkyl)_2-OH]$. In the most preferred embodiment, the alkyl is methyl. F2 can thus be introduced with hexamethylcyclotrisiloxane ($D_3$) as a chain terminator.

In accordance with that, a highly preferred embodiment of the polymer according to a) is "Amine-A-$(SiR_1R_2—O—)_x$ $SiR_1R_2OH$, with $R_1$, $R_2$=alkyl and x=1 to 500. The amine group can be represented by one of the formulas —$N(R_1)_2$, —$N(R_2)_2$, —$N(R_1R_2)$, —$N(R_1)H$, —$N(R_2)H$, —$NH_2$, with $R_1$ and $R_2$=alkyl, linear or branched, cycloalkyl, aryl, alkaryl, aralkyl or vinyl groups, in each case having 1 to 20 carbon atoms. Advantageously, A is S—SSBR, and $R_1$=$R_2$=$CH_3$. A highly preferred embodiment of the branched or astral coupling product is (Amine-A-)$_n$C, with the same particulars as above and C═Sn or Si.

Polysiloxane sequences or blocks can also be incorporated and distributed along the polymeric chains although they are preferentially terminal.

The functionalizations, F1 and F2, are introduced in order to improve the cohesion or binding force between rubber and filler, i.e. carbon black or silicon-oxide-based (in this case preferably generally white) fillers.

The mixture can moreover comprise conventional additives, such as plasticizers, antioxidants, UV stabilizers, mold-release agents, vulcanization accelerators and vulcanization retarders, activators, e.g. zinc oxide and fatty acids (e.g. stearic acid), waxes and mastication aids in conventional parts by weight. Bifunctional coupling agents, particularly preferably silanes and amines, can also be used as additives for the rubber mixtures.

The filler present in the mixture can preferably be what is known as a "white filler" or else carbon black. In one preferred embodiment, the filler comprises at least one silicon-oxide-based filler (silica, silicic acid) or comprises another "white" filler individually or in a mixture and can also comprise carbon black in the mixture.

The filler preferably comprises a mixture composed of at least one silicon-oxide-based filler and of at least one grade of carbon black. Suitable silicon-based fillers and carbon blacks for technical rubber moldings and tire mixtures are known in the prior art and can be used here. The fillers and rubbers of the mixture can likewise have been modified in the manner known in principle from the prior art for rubber mixtures.

The white filler can moreover preferably be an oxidic and/or hydroxidic inorganic or mineral filler, or comprise any desired combination of these substances. The white filler has preferably been selected from the group of silica ($SiO_2$), phyllosilicates, chalk, starch, oxides and/or hydroxides of aluminum, magnesium, titanium or zinc.

The proportion present of the filler in the mixture is advantageously from 20 to 200 phr, preferably from 30 to 150 phr, more preferably from 30 to 130 phr.

The invention also encompasses the use of a rubber mixture according to the invention as described above for the production of a rubber product, in particular a vehicle tire, preferably a vehicle tire tread, a hose, a belt, a technical molding, a vibration damper or impact damper, or a wire coating, as well as the products themselves. All these products benefit from the improved properties of the rubber elastomers according to the invention, especially to the improved processability prior to vulcanization.

DESCRIPTION OF THE PREFERRED EMBODIMENTS OF THE INVENTION

The invention is now described in more detail with reference to the following examples and tests. The examples and tests are only given for an easier understanding of the invention, i.e. for solely illustrative purposes and are not meant to delimit the scope of the invention in any way.

EXAMPLES

The polymers referred to in the following examples are denoted as follows:

| Polymer "A" | State of the Art Reference | (chain A) = SSBR |
| Polymer "B" | State of the Art Reference | (chain A)-SiOR, 80% funct. |
| Polymer "C" | a) inventive | $NR_2$-(chain A), 20-30 wt. % and $NR_2$-(chain A)-SiOR, 70-80 wt. % |
| Polymer "D" | b) inventive | ($NR_2$-(chain A))$_4$Sn, ca. 30% and $NR_2$-(chain A)-SiOR, ca 70% (wt.) |
| Polymer "E" | b) inventive | ($NR_2$-(chain A))$_4$Si, ca. 30% and $NR_2$-(chain A)-SiOR, ca 70% (wt.) |

$NR_2$-(chain A) = Amine-(chain A), where Amine is a pyrrolidine derivative;
SiOR = (—Si(CH$_3$)$_2$O)$_n$—Si(CH$_3$)$_2$OH

TABLE 1 microstructure of polymers

| | SSBR wt.-% | Coupling | Funct. Start of chain | Funct. End of chain |
|---|---|---|---|---|
| A | 21 styrene 63 vinyl | — | — | — |
| B | 21 styrene 63 vinyl | — | — | Siloxane |
| C | 21 styrene 63 vinyl | — | Amine | Siloxane |
| D | 21 styrene 63 vinyl | Sn (30%) | Amine | Siloxane |
| E | 21 styrene 63 vinyl | Si (30%) | Amine | Siloxane |

TABLE 2a

Composition of Mixtures

| | A | B | B-NR | B-BR | C | C-NR | C-BR |
|---|---|---|---|---|---|---|---|
| NR | — | — | 50 | — | — | 50 | — |
| BR | — | — | — | 50 | — | — | 50 |
| A | 100 | — | — | — | — | — | — |
| B | — | 100 | 50 | 50 | — | — | — |
| C | — | — | — | — | 100 | 50 | 50 |
| D | — | — | — | — | — | — | — |
| E | — | — | — | — | — | — | — |
| Silica | 95 | 95 | 95 | 95 | 95 | 95 | 95 |
| Oil | 35 | 35 | 35 | 35 | 35 | 35 | 35 |
| 6PPD | 2 | 2 | 2 | 2 | 2 | 2 | 2 |
| TMQ | 2 | 2 | 2 | 2 | 2 | 2 | 2 |
| OZONE PROTECTING WAX | 2 | 2 | 2 | 2 | 2 | 2 | 2 |
| ZnO | 3 | 3 | 3 | 3 | 3 | 3 | 3 |
| STEARIC ACID | 3 | 3 | 3 | 3 | 3 | 3 | 3 |
| Silane | 8 | 8 | 8 | 8 | 8 | 8 | 8 |
| DPG | 2 | 2 | 2 | 2 | 2 | 2 | 2 |
| CBS | 2 | 2 | 2 | 2 | 2 | 2 | 2 |
| S | 2 | 2 | 2 | 2 | 2 | 2 | 2 |

TABLE 2b

Composition of Mixtures

| | D | C-NR | D-BR | E | E-NR | E-BR |
|---|---|---|---|---|---|---|
| NR | — | 50 | — | — | 50 | — |
| BR | — | — | 50 | — | — | 50 |
| A | — | — | — | — | — | — |
| B | — | — | — | — | — | — |
| C | — | — | — | — | — | — |
| D | 100 | 50 | 50 | — | — | — |
| E | — | — | — | 100 | 50 | 50 |
| Silica | 95 | 95 | 95 | 95 | 95 | 95 |
| Oil | 35 | 35 | 35 | 35 | 35 | 35 |

TABLE 2b-continued

Composition of Mixtures

|  | D | C-NR | D-BR | E | E-NR | E-BR |
|---|---|---|---|---|---|---|
| 6PPD | 2 | 2 | 2 | 2 | 2 | 2 |
| TMQ | 2 | 2 | 2 | 2 | 2 | 2 |
| OZONE PROTECTING WAX | 2 | 2 | 2 | 2 | 2 | 2 |
| ZnO | 3 | 3 | 3 | 3 | 3 | 3 |
| STEARIC ACID | 3 | 3 | 3 | 3 | 3 | 3 |
| Silane | 8 | 8 | 8 | 8 | 8 | 8 |
| DPG | 2 | 2 | 2 | 2 | 2 | 2 |
| CBS | 2 | 2 | 2 | 2 | 2 | 2 |
| S | 2 | 2 | 2 | 2 | 2 | 2 |

Values of both tables given in phr;
Silane functionalization reagent: Silquest A 1589, General Electric Specialty, USA
6PPD=N-(1,3-dimethylbutyl)-N'-phenyl-p-phenylenediamine
CBS=benzothiazyl-2-cyclohexylsulphenamide
TMQ=2,2,4-trimethyl-1,2-dihydroquinoline
DPG=N,N-diphenylguanidine
Oil/plasticizer=TDAE
Silica=VN3, Degussa AG, Germany, nitrogen surface area: 175 m$^2$/g, CTAB surface area 160 m$^2$/g;

TABLE 3a test results

|  | unit | A | B | B-NR | B-BR | C | C-NR | C-BR |
|---|---|---|---|---|---|---|---|---|
| Hardness Shore A RT | ShA | 72.1 | 69.5 | 70 | 68.9 | 71 | 70.1 | 69.6 |
| Hardness Shore A 70° C. | ShA | 69.5 | 66.4 | 66.6 | 66.1 | 68 | 66.3 | 66.9 |
| Resilience RT | % | 15.4 | 15.9 | 23.1 | 33.6 | 16.6 | 23.8 | 33.5 |
| Resilience 70° C. | % | 43.5 | 49 | 48.2 | 50.8 | 48.6 | 49.3 | 50.9 |
| Tensile Strength at RT | Mpa | 14.6 | 14.8 | 16.9 | 15.1 | 13.9 | 17.1 | 16.7 |
| Elongation at break at RT | % | 392 | 359 | 530 | 502 | 341 | 523 | 537 |
| Stress (Elongation) - 100% | MPa | 3.2 | 3.13 | 2.32 | 2.35 | 3.06 | 2.38 | 2.42 |
| Stress (Elongation) - 300% | MPa | 11.54 | 12.96 | 9.11 | 8.23 | 13.08 | 9.38 | 8.43 |
| Minimum torque | dN · m | 2.73 | 5 | 3.74 | 4.64 | 5.02 | 3.68 | 4.97 |

TABLE 3b test results

|  | unit | D | C-NR | D-BR | E | E-NR | E-BR |
|---|---|---|---|---|---|---|---|
| Hardness Shore A RT | ShA | 71.5 | 70.4 | 69.9 | 70.8 | 70.6 | 70.6 |
| Hardness Shore A 70° C. | ShA | 68.9 | 66.8 | 67.3 | 67.7 | 67.1 | 67.4 |
| Resilience RT | % | 16.5 | 24.8 | 32.9 | 16.2 | 23.6 | 32.3 |
| Resilience 70° C. | % | 48.7 | 47.7 | 48.8 | 49.1 | 48.2 | 49.6 |
| Tensile Strength at RT | Mpa | 15 | 16.6 | 16.6 | 16.7 | 17.6 | 15.4 |
| Elongation at break at RT | % | 376 | 521 | 562 | 382 | 538 | 495 |
| Stress (Elongation) - 100% | MPa | 3.13 | 2.49 | 2.33 | 3.23 | 2.54 | 2.47 |
| Stress (Elongation) - 300% | MPa | 12.51 | 9.24 | 7.9 | 13.62 | 9.51 | 8.74 |
| Minimum torque | dN · m | 4.01 | 3.49 | 4.42 | 4.01 | 3.4 | 4.48 |

The improved processability is reflected by the lower viscosities of the rubber mixtures, illustrated by the value of the minimum torque, according to the invention prior to vulcanization. Thus, the examples according to the invention show the desired properties with respect to the objective of the invention.

The following test methods were used when testing the specimens:
Shore A hardness at room temperature and 70° C. to DIN 53 505
rebound at room temperature and 70° C. to DIN 53 512
tensile strength at room temperature to DIN 53 504
elongation at break (tear elongation) at room temperature to DIN 53 504
stress values at 100 and 300% static elongation at room temperature to DIN 53 504
minimum torque according to DIN 53 523

It is understood that the foregoing description is that of the preferred embodiments of the invention and that various changes and modifications may be made thereto without departing from the spirit and scope of the invention as defined in the appended claims.

What is claimed is:

1. Vulcanizable rubber mixture which comprises at least one polymer functionalized at least at one chain end (terminally) for binding to fillers, at least one filler and, optionally, additives, wherein the amount of terminally functionalized polymers in the rubber mixture amounts to from 10 to 100 phr and comprises a polymer or a mixture of polymers according to the following particulars:
   a) said functionalized polymer can be represented by the formula F1-A-F2; or,
   b) alternatively, said mixture of functionalized polymers is a mixture of a) with an astral or radial coupling product of F1-A-units, coupled by a multivalent coupling agent;

wherein F1 represents a terminal functionalization of the polymeric chain, and represents pyrrolidinyl;
F2 represents a terminal functionalization different from F1 and wherein F2 is a functional group chosen from the following list, the degree of functionalization, based on the weight of the elastomer(s), being from 30% to 100%:
silyl, silanol or siloxane groups inclusive of, in each case attached to the polymer chain with or without a spacer, polysiloxane groups and siloxane and polysiloxane groups comprising amino groups represented by the structures: —SiH$_2$(OH), —Si(R$_1$)$_2$(OH), —SiH(OH)$_2$, —SiR$_1$(OH)$_2$, —Si(OH)$_3$, —(SiR$_1$R$_2$O)$_x$—R$_3$, where x is the number of repetitive units and is from 1 to 500, R$_1$ and R$_2$ are identical or different, linear or branched, cycloalkyl, aryl, alkylaryl, aralkyl or vinyl groups, in each case having 1 to 20 carbon atoms, and R$_3$ is H, as well as siloxane groups that comprise amine groups, represented by the formula -A1-Si-(A2-N((H)$_k$(R$_1$)$_{(2-k)}$))$_y$(OR$_1$)$_z$(R$_4$)$_{3-(y+z)}$, where: k can vary from 0 to 2, y can vary from 1 to 3, and z can vary from 0 to 2, 0≤y+z≤3, provided that R$_1$ and R$_2$ are identical or different, and can be alkyl, linear or branched, cycloalkyl, aryl, alkylaryl, aralkyl or vinyl groups, in each case having 1 to 20 carbon atoms, and mononuclear aryl groups, R$_4$ is H or alkyl, linear or branched, in each case having 1 to 20 carbon atoms, or a mononuclear aryl group, and A1 and A2 are chains of up to 12 carbon atoms, linear or branched;

and A represents the polymeric chain of a polymer formed by the copolymerization between one or more conjugated dienes with one or more aromatic vinyl monomers.

2. The vulcanizable rubber mixture according to claim 1, where A is a randomly or statistically polymerized polymer.

3. The vulcanizable rubber mixture according to claim 1, wherein the conjugated diene of chain A is butadiene, isoprene or a mixture of butadiene and/or isoprene.

4. The vulcanizable rubber mixture according to claim 1, wherein the aromatic vinyl compound is styrene, ortho-, meta- and/or para-methylstyrene, vinyltoluene, p-tert-butylstyrene, methoxystyrene, vinylmesitylene and/or divinylbenzene.

5. The vulcanizable rubber mixture according to claim 1, wherein the main chain polymer which is a microsequentially polymerized copolymer composed of conjugated diene and of aromatic vinyl compound comprises microblocks of a comonomer of length from 2 to 10 units.

6. The vulcanizable rubber mixture according to claim 1, wherein the content of 1,2-vinylic units in the polymeric chains A is from 8% to 80%, preferably from 11% to 80%, and more preferred from 10% to 70%, based on the total of the conjugated diene incorporated in the copolymer, and can also present different contents of 1,4-cis, and 1,4-trans units, as well as 3,4-vinyl, depending on the conjugated diene employed.

7. The vulcanizable rubber mixture according to claim 1, wherein the composition of the polymeric chain A in weight percent is in the range from 5% to 50% for the aromatic vinyl monomer, and in the range from 50% to 95% for the conjugated diene.

8. The vulcanizable rubber mixture according to claim 1, wherein at least one of the following conditions is met for the polymer of chain A: the Mooney Viscosity (ML1+4 @ 100° C.) is in a range from 30 to 90, an average molecular weight is in the range from Mw=80,000 to 700,000, with a polydispersion in the range from 1.05 to 4.0, based on polystyrene standards, glass transition temperatures Tg are in the range from −92° C. to −1° C.

9. The vulcanizable rubber mixture according to claim 1, wherein the rubber mixture comprises from 30 to 90 phr of the polymers according to a) or b), and the 10 to 70 phr of residual rubber content are composed of at least one elastomer rubber from the group consisting of natural rubber (NR), synthetic polyisoprene (IR), polybutadiene (BR), polychloroprene (CR), SBR, IBR and SIBR.

10. The vulcanizable rubber mixture according to claim 1, wherein the multivalent coupling agent is Sn or Si.

11. Vulcanizable rubber mixture according to claim 1, wherein the filler is entirely or mainly composed of an oxidic and/or hydroxidic inorganic or mineral filler selected from the group consisting of silica (SiO$_2$), phyllosilicates, chalk, oxides and/or hydroxides of aluminum, magnesium, titanium and zinc.

12. The vulcanizable rubber mixture according to claim 11, wherein the proportion present of the filler in the mixture is from 20 to 200 phr.

13. Method of preparing a rubber mixture according to claim 1 for the production of a vehicle tire, a vehicle tire tread, a hose, a belt, a technical molding or a vibration damper or impact damper.

14. A technical rubber product comprising a vulcanized rubber mixture according to claim 1.

15. The technical rubber product according to claim 14, wherein the product is a tread for a vehicle tire.

16. Vehicle tires with the tread according to claim 15.

* * * * *